US006611809B1

United States Patent
McCalden (10) Patent No.: US 6,611,809 B1
(45) Date of Patent: Aug. 26, 2003

(54) METHOD AND APPARATUS FOR SELECTING TAXPAYER AUDITS

(75) Inventor: John D. McCalden, Reston, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/399,226

(22) Filed: Sep. 20, 1999

(51) Int. Cl.[7] .............................................. G06F 17/60
(52) U.S. Cl. ................................ 705/7; 705/31; 705/19
(58) Field of Search .............................. 705/10, 19, 31

(56) References Cited

U.S. PATENT DOCUMENTS 5,581,678 A * 12/1996 Kahn

FOREIGN PATENT DOCUMENTS

JP        357189265 A  * 11/1982  .................. 705/19

OTHER PUBLICATIONS

Kaplan, Martin. "What the IRS Doesn't Want You to Know." 1997 Villard Books, Fourth Edition. pp. 47–49, 123–124.*
Coats, eddie, and Panda, Raj. "Data Warehousing and Audit Selection." Aug. 17, 1999. FTA Workshop Presentation.*
Eddie Coats, et al.; Data Warehousing & Audit Select Scoring; FTA Tech Workshop Presentation, Aug. 17, 1999, pp. 1–20.

* cited by examiner

Primary Examiner—James P. Trammell
Assistant Examiner—James A. Reagan
(74) Attorney, Agent, or Firm—Staas & Halsey LLP (57) ABSTRACT

A method and apparatus for selecting taxpayers to audit by a tax collecting entity. An underreporting model is created, and indicates probability of an assessment being made against respective taxpayers from historical data. An analytical space is created for analyzing the taxpayers, and is based on the underreporting model. Taxpayers are positioned within the analytical space. Factors within the analytical space are analyzed, based on historical data. The analyzed factors are used to predict audit return on auditors' time when auditing taxpayers. Then, assessments against taxpayers are forecasted, based on the predicted audit return. A basis for audit selection is formulated from the forecasted assessments. In this manner, a total audit assessment amount collected by the tax collecting entity can be maximized.

18 Claims, 8 Drawing Sheets

AVERAGE HOURS PER AUDIT

| SCORE | ANNUAL SALES TAX REVENUE | | |
|---|---|---|---|
| | <$1M | $1M-$7.5M | $7.5M+ |
| 1 | 22.9 | 34.1 | 49.4 |
| 2 | 19.8 | 40.6 | 56.6 |
| 3 | 24.5 | 30.9 | 44.5 |
| 4 | 25.8 | 29.3 | 53.0 |
| 5 | 23.8 | 37.3 | 58.2 |
| 6 | 21.7 | 33.9 | 61.3 |
| 7 | 43.8 | 35.1 | 58.5 |
| 8 | 20.4 | 37.1 | 47.9 |
| 9 | 26.4 | 31.3 | 57.1 |
| 10 | 22.9 | 36.2 | 52.9 |
| AVERAGE: | 25.2 | 34.6 | 53.9 |

FIG. 3

DISCOUNTED AVERAGE ASSESSMENT $ PER AUDITOR HOUR

| SCORE | AVERAGE ASSESSMENT/HOUR | | |
|---|---|---|---|
| | <$1M | $1M-<$7.5M | $7.5M+ |
| 1 | 602.4 | 248.2 | 399.6 |
| 2 | 263.5 | 268.1 | 367.6 |
| 3 | 211.4 | 398.9 | 568.9 |
| 4 | 451.5 | 153.3 | 835.9 |
| 5 | 410.8 | 530.5 | 509.4 |
| 6 | 401.1 | 433.4 | 1347.8 |
| 7 | 266.3 | 855.0 | 635.3 |

|            | FORECAST | ACTUAL   | FOR/ACT |
|------------|----------|----------|---------|
| TOT HRS    | 59974    | 59645    | 101%    |
| TOT REV    | 39636931 | 25710934 | 154%    |
| TOT AUDITS | 1165     | 1596     | 73%     |
| REV/HR     | 661      | 431      | 153%    |
| REV/AUDIT  | 34037    | 16110    | 211%    |

METHOD AND APPARATUS FOR SELECTING TAXPAYER AUDITS

CROSS REFERENCE TO RELATED APPLICATION

This application is related to U.S. application entitled "METHOD AND APPARATUS FOR PROMOTING TAXPAYER COMPLIANCE," having Ser. No. 09/375,214, by McCalden et al., filed Aug. 16, 1999, and incorporated by reference herein.

BACKGROUND OF THE INVENTION

1. Field of the Invention

The present invention relates to a method and apparatus for selecting taxpayers to audit by a tax collecting entity, and which maximizes total audit assessment amount.

2. Description of the Related Art

Tax collecting entities (such as, for example, state or federal Departments of Revenue) typically audit taxpayers to improve taxpayer compliance in regard to tax liabilities. Therefore, these tax collecting entities must select specific taxpayers to audit. This process of selecting specific taxpayers to audit will hereinafter be referred to as "audit selection."

Typically, audit selection is a manual, ad hoc basis, where auditors simply select a taxpayer to audit based on some specific criteria which happens to be noticed by the auditor. Often, taxpayers are selected for auditing based on referrals, that is, links to related taxpayers that are being audited. In some cases, taxpayers are randomly selected to be audited.

Unfortunately, such conventional approaches to audit selection are inefficient in using the resources of the taxing entity, and do not effectively maximize the total audit assessment amount (that is, the total amount of money assessed against taxpayers as a result of audits being performed).

SUMMARY OF THE INVENTION

Accordingly, it is an object of the present invention to provide an audit selection technique which effectively uses the resources of a taxing entity, and increases, or maximizes, the total audit assessment amount.

Additional objects and advantages of the invention will be set forth in part in the description which follows, and, in part, will be obvious from the description, or may be learned by practice of the invention.

Objects of the present invention are achieved by providing an audit selection method and apparatus in which taxpayers to audit are selected so that the total audit assessment amount is maximized.

Objects of the present invention are also achieved by providing an audit selection method which includes (a) creating an underreporting model indicating probability of an assessment being made against respective taxpayers from historical data; (b) creating an analytical space for analyzing the taxpayers, the analytical space being based on the underreporting model; (c) positioning taxpayers within the analytical space; (d) analyzing factors within the analytical space based on historical data; (e) using the analyzed factors to predict audit return on auditors' time when auditing taxpayers; (f) forecasting assessments against taxpayers based on the predicted audit return; and (g) formulating a basis for audit selection from the forecasted assessments.

In addition, objects of the present invention are achieved by providing an audit selection method which includes (a) scoring taxpayers based on historical data to provide respective taxpayers with a score indicating a probability of an assessment being made against the taxpayer if an audit of the taxpayer is conducted; (b) assigning taxpayers into categories so that taxpayers with the same score can have different probabilities of an assessment based on the category of the taxpayer; (c) creating an analytical space for analyzing the taxpayers, the analytical space defined by the taxpayer score and category; (d) positioning taxpayers within the analytical space based on their score and category; (e) analyzing factors within the analytical space based on historical data; (f) using the analyzed factors to predict audit return on auditors' time when auditing taxpayers; (g) forecasting assessments against taxpayers based on the predicted audit return on auditors' time; and (h) formulating a basis for audit selection from the forecasted assessments.

Moreover, objects of the present invention are achieved by providing an audit selection method which includes (a) scoring taxpayers based on historical data to provide respective taxpayers with a score indicating a probability of an assessment being made against the taxpayer if an audit of the taxpayer is conducted; (b) assigning taxpayers into categories so that taxpayers with the same score can have different probabilities of an assessment based on the category of the taxpayer; (c) creating an analytical space, the analytical space being a graph having a first axis indicating score and a second axis indicating category, the graph having cells at each intersection of score and category; (d) positioning taxpayers within the analytical space based on their score and category; (e) recalculating the probability of making an assessment within each cell of the graph, based on the actual taxpayers in that cell; (f) performing a regression for each category based on the recalculated probabilities, to determine an equation for each category which forecasts probabilities that an assessment will be made for taxpayers in that category; (g) calculating an average assessment amount for cases in each cell of the graph; (h) determining the time taken to perform an audit for each cell of the graph; (i) using the equations, calculated average assessment amounts and determined time taken to perform an audit, to predict audit return on auditors' time; (j) forecasting assessments against taxpayers based on the predicted audit return on auditors' time; and (k) formulating a basis for audit selection from the forecasted assessments.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
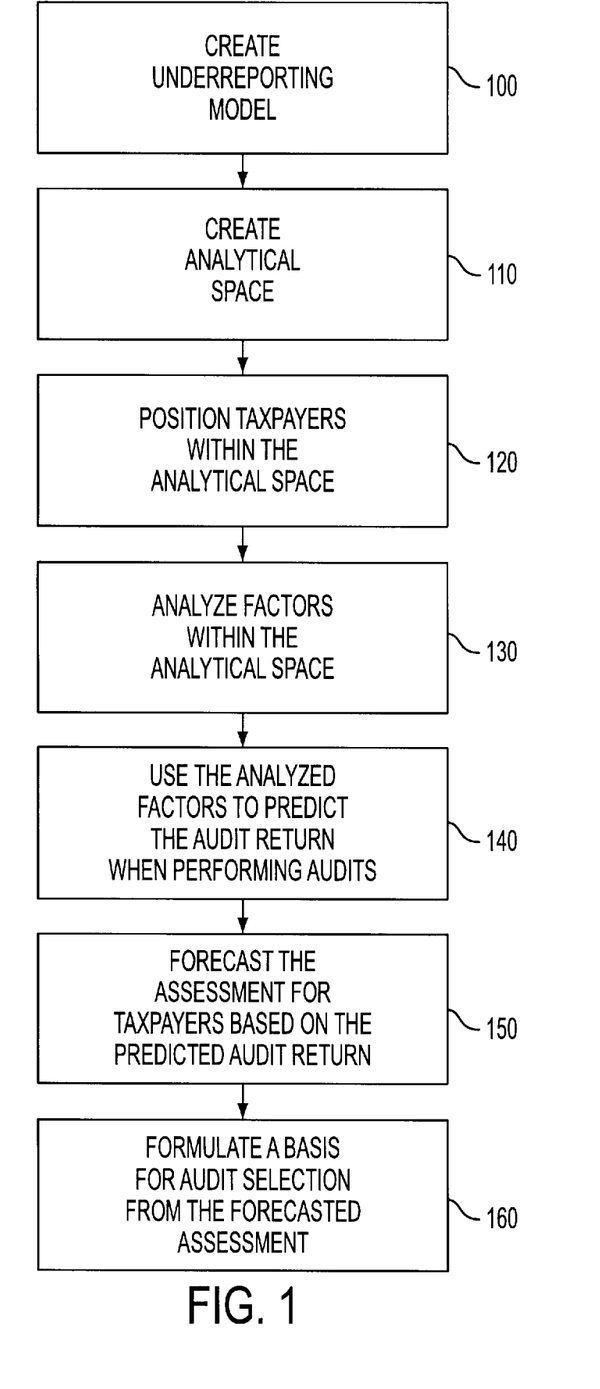
FIG. 1 is a flow chart illustrating an audit selection technique, according to an embodiment of the present invention.

FIG. 1 is a flow chart illustrating an audit selection technique, according to an embodiment of the present invention. Referring now to FIG. 1, in step 100, an underreporting model is created to predict taxpayer compliance risk. The underreporting model should score respective taxpayers to indicate the probability of making an assessment on the taxpayers if an audit was conducted. The underreporting model should divide the taxpayers into different categories, and preferably correlate scores to categories so that taxpayers with the same score will have different probabilities of making an assessment based on the category of the taxpayer.

From step 100, the process moves to step 110, where an analytical space is created, based on the scores and categories of the underreporting model.

From step 110, the process moves to step 120, where the taxpayers are positioned in the analytical space.

From step 120, the process moves to step 130, where factors within the analytical space are analyzed, based on historical data.

From step 130, the process moves to step 140, where the analyzed factors are used to predict an audit return when audits are performed.

From step 140, the process moves to step 150, where an assessment is forecasted for taxpayers based on the predicted audit return.

From step 150, the process moves to step 160, wherein a basis for audit selection is formulated from the forecasted assessment.

Figure 2:
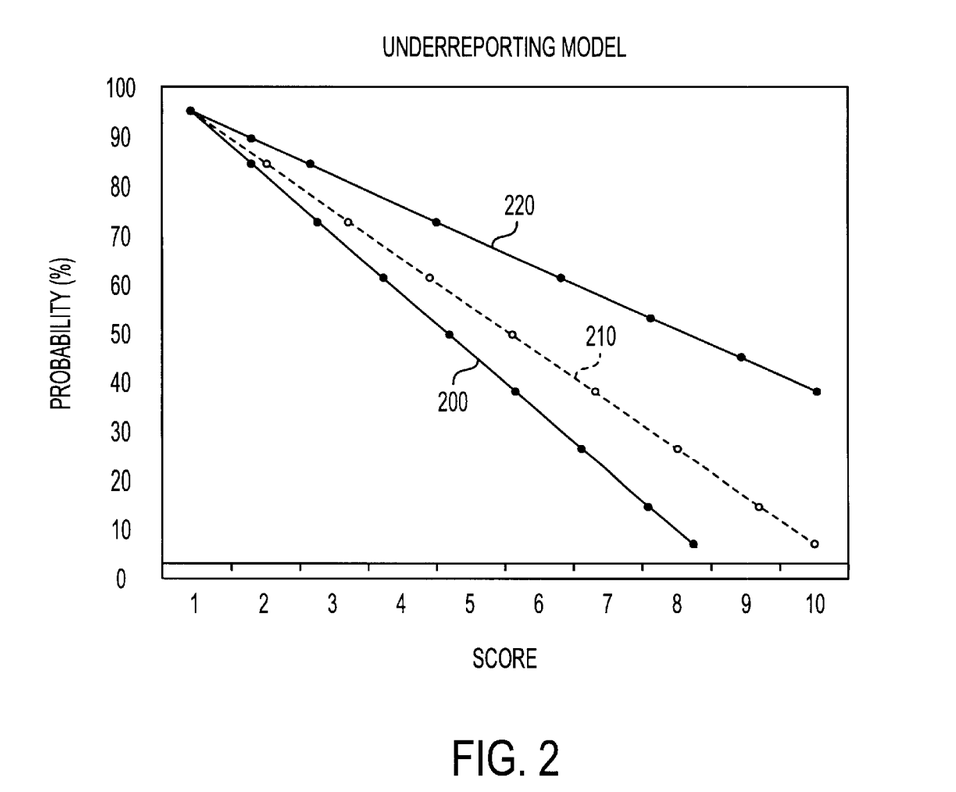
FIG. 2 is a graph illustrating an example of the creation of an underreporting model, according to an embodiment of the present invention.

FIG. 2 is a graph illustrating an example of the creation of an underreporting model in step 100 of FIG. 1, according to an embodiment of the present invention. More specifically, FIG. 2 is a graph illustrating an underreporting model to predict taxpayer compliance risk. In this example, taxpayers are given a score from one to ten. This score predicts the probability of an assessment being made on that taxpayer if an audit was conducted. In this example, each taxpayer represents a business that pays sales tax, and the taxpayers are divided into categories based on the annual sales tax revenue for that taxpayer. For example, in this example, taxpayers are divided into three categories: a first category includes taxpayers with annual sales tax revenue less than $1 million, a second category includes taxpayers with annual sales tax revenue of greater than or equal to $1 million and less than or equal to $7.5 million, and a third category includes taxpayers with annual sales tax revenue of great than $7.5 million. These categories were selected because, from an analysis of historical data, they each have a relatively equal number of taxpayers, they showed differences between each other, and they were large enough to support subsequent analysis. However, are many different ways to determine categories, and the present invention is not limited to any particular way. In addition, there are many different factors (such as, for example, tax revenue) on which to base a category, and the present invention is not limited to basing categories on any particular factor. Moreover, in this example, taxpayers are given a score of one to ten However, these scores are only examples, and the present invention is not limited to any particular scores or score ranges.

As illustrated by the graph in FIG. 2, once taxpayers are scored and categories are formed, the underreporting model predicts the probability of an assessment being made, based on the taxpayer score and category. For example, in FIG. 2, curve 200 predicts the probability of an assessment being made versus the score for the first category (taxpayers with annual sales tax revenue less than $1 million). Curve 210 predicts the probability of an assessment being made versus the score for the second category (taxpayers with annual sales tax revenue of greater than or equal to $1 million and less than or equal to $7.5 million). Curve 220 predicts the probability of an assessment being made versus the score for the third category (taxpayers with annual sales tax revenue of great than $7.5 million).

Of course, FIG. 2 represents only one specific example of an underreporting model, and the present invention is not limited to this specific underreporting model.

As indicated above, with the underreporting model, a score is calculated for each taxpayer. The score can be translated into a probability of making an assessment against the taxpayer. The calculated score is based on a number of selected characteristics. The use of scores to score accounts/customers for various characteristics is well-known. For example, credit card companies often calculate a collections score for customers, indicating the probability that the customer's account will be paid in full. Loan companies and credit evaluation companies often calculate a credit score to determine credit worthiness for potential customers. Scores are often calculated to determine customers' propensity to buy. Attrition scores are often calculated to determine whether a customer will close his/her relationship with a particular company. Therefore, the use of scores to predict the probability of making an assessment against a taxpayer if an audit is performed, would be understandable by a person of skill in the art. Moreover, a person of skill in the art would understand how to calculate such a score, or provide a score model to produce the scores.

As a general, simplified example, a score predicting the probability of making an assessment might be based on four, five or six different variables. For example, if total revenue in a previous calendar year for a taxpayer fill into one of three or four categories, then that taxpayer would get a certain number of points. A first category might be less than $1 million. A second category might be greater than or equal to $1 million and less than or equal to $20 million. A third category might be greater than or equal to $20 million. 30 points might be given to taxpayers in the first category, 20 points might be given to taxpayers in the second category, and 10 points might be given to taxpayers in the third category. In this example, fewer points indicate a higher risk of an assessment being made. A score would then be computed based on the total points for a respective taxpayer for all the different variables forming the basis of the score.

As an example, a behavior model, such as a score model to score taxpayers to predict the probability of making an assessment, would typically be developed using logistic regression. Logistic regression is a known classification and probability assessment technique that fits a smooth S-shaped curve to a set of data. Generally, the curve asymptotically approaches 0 at one end and 1 (or 100%) at the other. A key strength of logistic regression is that it does not rely on statistical assumptions about the underlying data. This is important because simplifying assumptions about real world data can be misleading or incorrect.

In this example of a score model, estimates of coefficients are generated for each defined range of each predictor used in a model. These coefficients are then scaled so that the lowest score weight for each characteristic is zero and so that the odds that a taxpayer will remain good (that is, comply with tax regulations) double with a specified increase in score (for example, 20 points). These odds are defined as the ratio of the probability that a taxpayer will stay good and the probability that it will go bad (that is, under report tax liabilities).

Modeling is an iterative process, and the rules for variable selection are applied with each iteration. If two predictors prove to carry similar (redundant) information, one should be removed. Other variables may be weak and add complexity to the model without adding strength, and these should also be removed. In this way, a model evolves with good predictive power.

Another part of the iterative modeling technique is the selection of appropriate groupings for the values of each predictor. For example, "time on books" may be predictive, but it may be observed in modeling that there is no significant difference between three or more years on the books. Values (or ranges) exhibiting similar performance are grouped together. A predictor can have as many as, for example, eight or as few as, for example, two value ranges, and each range should contain sufficient data to be statistically significant.

If the robustness of the model is satisfactory, the preliminary model can be changed if it is determined that predictors should be added or deleted for business reasons. In addition, desired minimum scores can be specified in the model for each taxpayer. This minimum score should be a constant which is incorporated into the score weights of one or all of the predictors. Through this process, a final model can be defined.

Completed models can be used to score cases in the following way. For example, each model might typically comprise a number of predictors, such as, for example, "number of returns with partial payments" or "corporate income tax indicator." In turn, each predictor can be classified into a discrete number of value ranges. For example, the "number or returns with partial payments" could be classified into discrete categories such as "none," "one" and "two or more." Thus, in this case there would be three categories. For each predictor, the range of categories in total should be all inclusive. That is, no case should have a value that results in it not being assigned to one of the categories. Associated with each categories should be a specific number of points, as defined by the modeling process.

When a taxpayer is scored, the taxpayer is preferably evaluated against all predictors. For each predictor a number of points is assigned to the taxpayer, depending on its value for that predictor and, thus, the value range to which it is assigned. When the taxpayer has been evaluated against all predictors the points assigned for each predictor are added to get the total "score" for that taxpayer.

When a taxpayer is scored using such a model, its score may be used to calculate the probability that the taxpayer will become bad. This probability calculation would typically be as follows:

$$\text{Probability(bad)} = 1/(1+e^{(mX+b)})$$

In the above formula, "X" represents the score calculated by the model, "m" is the slope of the fitted logistic curve, and "b" is its intercept. The slope and intercept parameters are determined as part of the modeling process and are delivered with the model. As a model ages, an updated slope and intercept can be derived so that appropriate adjustments may be made to the model's performance table. These adjustments will allow informed business decisions to be made on cutoff scores for various decisions, and other model issues.

The above example of a behavior model using logistic regression is only intended as an example, the present invention is not intended to be limited to this modeling technique, or this specific example. Instead, there are many different manners of determining a score for assessing the probability of making an assessment, and the present invention is not limited to any particular manner.

As indicated above, an underreporting model is created, with taxpayers being scored to indicate the probability of an assessment being made. Then, as indicated in step 110 of FIG. 1, an analytical space is created.

Figure 3:
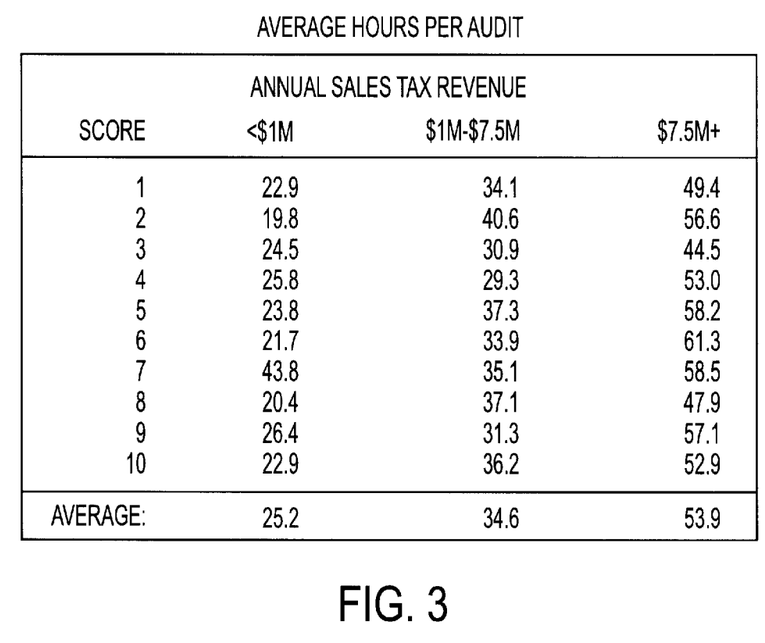
FIG. 3 is a graph illustrating the creation of an analytical space, according to an embodiment of the present invention.

For example, FIG. 3 is a graph illustrating the creation of an analytical space in step 110 of FIG. 1, according to an embodiment of the present invention. Referring now to FIG. 3, in this example, the analytical space is a graph having two axis, one for the underreporting scores and the other for the sales tax categories. Therefore, the analytical space is a graph having these axes, without the data entered in the graph.

Then, all taxpayers included in the analysis are positioned in the analytical space according to their underreporting score and sales tax revenue.

Thereafter, as indicated in step 130 of FIG. 1, several factors are analyzed within the analytical space.

For example, as a first analyzed factor, based on historical data, the probabilities of making an assessment are recalculated within the three sales tax categories. More specifically, for each cell in the graph of FIG. 3, the actual percentage of taxpayers that were accessed in that cell are determined. For example, in a specific cell, assume that there were a total of 100 taxpayers, 75 of which were made an assessment, and 25 of which no assessment was made. Therefore, for this cell, the actual percentage of taxpayers for which an assessment was made is 75% (that is 75/100). For a second cell, assume that there were a total of 200 taxpayers, 130 of which were made an assessment, and 70 of which no assessment was made. Therefore, for this cell, the actual percentage of taxpayers for which an assessment was made is 65% (that is 130/200). For a third cell, assume that there were a total of 225 taxpayers, 125 of which were made an assessment, and 100 of which no assessment was made. Therefore, for this cell, the actual percentage of taxpayers for which an assessment was made is 55% (that is 125/225). The actual percentage in each cell is based on all taxpayers in that cell, and not on all the taxpayers in the entire system for which an assessment was made, thereby removing the effect of the probability of making an assessment from the average assessment amount.

Then, for each category, a regression is performed using the actual percentages calculated for each cell in the category, to determine an equation to which forecasts probabilities that an assessment will be made for taxpayers in that category. In this manner, a separate equation can be determined for each category, to thereby forecast the probability of making an assessment for taxpayers in each category.

Next, as an additional factor which is analyzed in the analytical space of FIG. 3, the average assessment amount for cases in each cell is calculated and analyzed, based on historical data. (This analysis is not directly shown in any of the figures.)

A further factor which is analyzed in the analytical space of FIG. 3 is the time taken to perform audits, based on historical data. This data appears in the cells of FIG. 3. In the example of FIG. 3, the average time to perform an audit is not related to underreporting score. However, it varies by sales tax category significantly. As might be expected, in this example, the larger the sales tax paid, the longer it took to perform an audit. See, for example, the average totals at the bottom of the graph in FIG. 3.

Therefore, the various factors analyzed in the analytical space of FIG. 3 are based on historical data for taxpayers.

At this point, in this example, we now have three different analyzed factors: (1) the probability of making an assessment; (2) the average assessment amount; and (3) the time taken to perform an audit. It should be noted that the various analyzed factors used herein are only one specific example of the possible factors which can be analyzed, and the present invention is not limited to these specific factors.

After analyzing the factors, as indicated in step 140 in FIG. 1, the analyzed factors are used to predict the audit return when performing audits.

Figure 4:
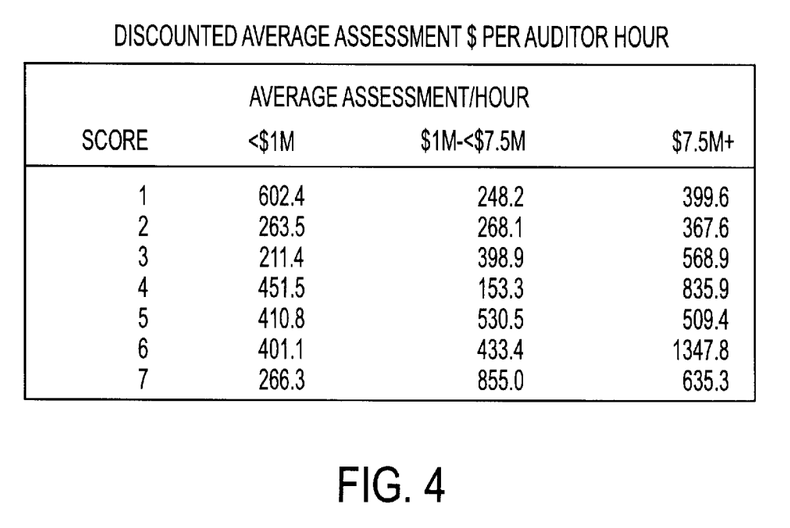
FIG. 4 is a graph illustrating predicted discounted average assessment amount per auditor hour, according to an embodiment of the present invention.

FIG. 4 is a graph illustrating the predicted discounted average assessment amount per auditor hour, according to an embodiment of the present invention. In this example, the audit return is measured in discounted average assessment amount per auditor hour. However, there are many other ways to measure return, and the present invention is not limited to any particular way. If desired, taxpayers can be selected for audit based on their position in the analysis space and the corresponding discounted hourly return for audits at that location.

To create the values in the cells of FIG. 4, the average assessment amount (that is, analyzed factor (2), above) in FIG. 3 for each cell is divided by the average hours per audit for that cell (that is, analyzed factor (3), above). Then, the probability of making an assessment (that is, analyzed factor (1), above) is re-introduced into the calculation by discounting the average assessment amount per auditor hour by the predicted probability of making an assessment. In this manner, in this example, the discounted average assessment amount per auditor hour (that is, a measurement of audit returns) is determined from the various analyzed factors. However, there are many other factors which can be analyzed, and many other ways to measure audit returns. The present invention is not limited to considering any specific factors, or to using any specific unit or type of measurement.

Thereafter, as indicated in step 150 of FIG. 1, the assessment for taxpayers based on the predicted audit returns is forecasted.

Figure 5:
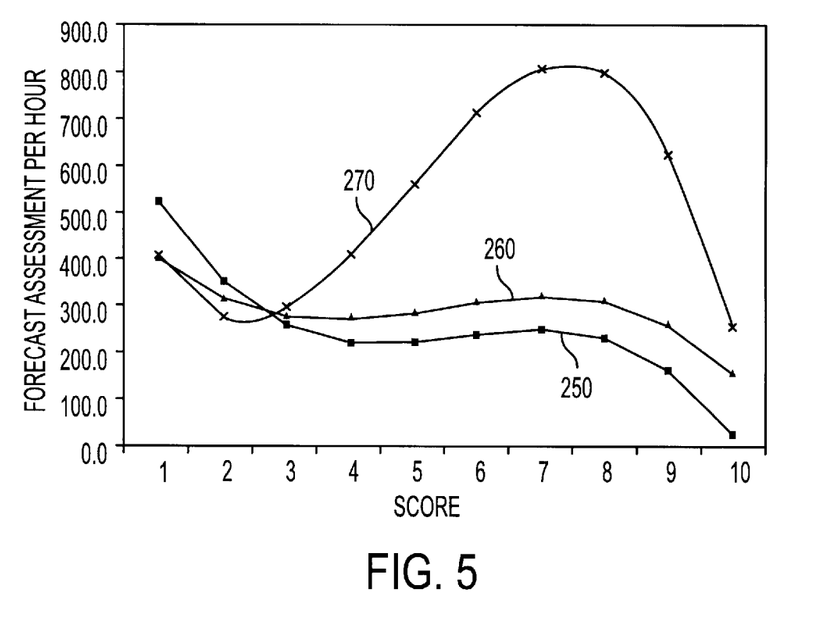
FIG. 5 is a graph illustrating forecasted assessment per hour, according to an embodiment of the present invention.

More specifically, FIG. 5 is a graph illustrating the forecasted assessment per hour, for each of the three categories, according to an embodiment of the present invention. In FIG. 5, curve 250 represents a forecast for the first category (taxpayers with annual sales tax revenue less than $1 million). Curve 260 represents a forecast for the second category (taxpayers with annual sales tax revenue of greater than or equal to $1 million and less than or equal to $7.5 million). Curve 270 represents a forecast for the third category (taxpayers with annual sales tax revenue of great than $7.5 million). To create these forecasts, polynomial cures are fitted to the discounted average assessment amount per auditor hour within each of the categories in FIG. 4.

Then, as indicated in step 160 of FIG. 1, a basis for audit selection is formulated from the forecasted assessment.

Figure 6:
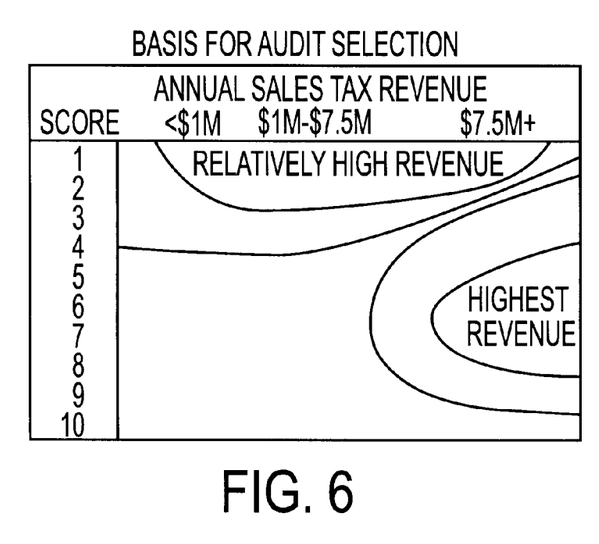
FIG. 6 is a graph illustrating an example of a basis for audit selection, according to an embodiment of the present invention.

For example, FIG. 6 is a graph which can be used to formulate a basis for audit selection. FIG. 6 is created by locating each taxpayer within the analysis space based on their underreporting score and sales tax. From this graph, cases are selected for audit, for example, based on the potential hourly assessment they would generate. For example, taxpayers in the "highest revenue" section of the graph generate the highest hourly assessment amount and should be selected first for auditing. Then, taxpayers in the "relatively high revenue" section of the graph, indicating the next highest revenue generating taxpayers, would be selected next. As each taxpayer is selected, a tally should preferably be kept of the total time required to perform those audits. Moreover, taxpayers that have already been selected should not be re-selected.

There are many different manner to select taxpayer from the graph in FIG. 6, and the present invention is not limited to any particular manner. The important concept is that the graph in FIG. 6 allows informed decisions to be made, and effective strategies to be implemented, to maximize return on auditors' time.

Figure 7:
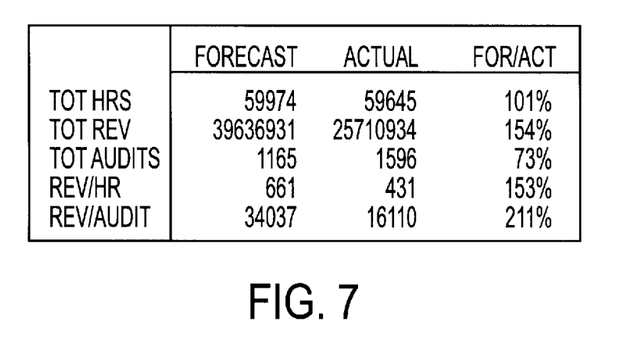
FIG. 7 is a graph illustrating selected statistics calculated from sample data of actual taxpayers, and which indicate the effectiveness of the present invention.

FIG. 7 is a graph illustrating selected statistics which were calculated from sample data of actual taxpayers. As indicated in FIG. 7, comparing the results forecasted by the present invention with the actual results obtained from historical data showed that the following improvements can be expected: (i) the total number of audits (Tot Audits) will decrease by 27%, (ii) the total assessment ,or generated revenue (Tot Rev), will increase by 54%, and (iii) the average assessment amount, or revenue/audit (Rev/Audit), will increase by 111%.

Clearly, the above described technique for selecting audits offers significant potential benefits. It also enables other uses and potential benefits. For example, audits not requiring Department of Revenue auditors can be applied to taxpayers (businesses or individuals) in certain areas of the analysis space. For example, in areas of the analytical space indicating a high probability of making an assessment but in the lower sales tax categories, taxpayers can be requested to perform a self-audit. Applying treatment in an effective way through a case management system would increase audit coverage, increase revenues and reduce future non-compliance.

In the above embodiments of the present invention, a taxpayer is described as representing a business that pays sales tax. However, there are many different types of taxpayers. For example, a taxpayer can be a business or an individual. Thus, the present invention is not limited to any particular type of taxpayer. Moreover, there are many different types of taxes, and the present invention is not limited to any particular type of tax. As an example, instead of applying to business taxpayers paying sales tax, the present invention is applicable to businesses paying other types of taxes, or individuals paying income tax.

The above-embodiments of the present invention can be performed manually by a human, or, preferable, by a computer. Thus, the processes described herein can easily be encoded in a computer readable medium to be performed by a computer.

Figure 8:
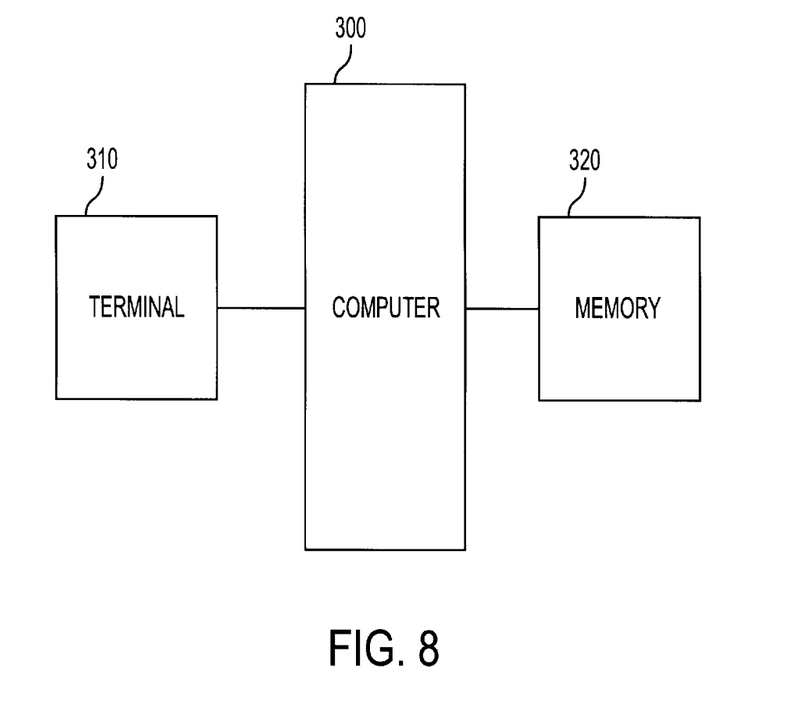
FIG. 8 is a diagram illustrating a computer for running software which performs the operations of the present invention.

For example, FIG. 8 is a diagram illustrating a computer for running software which performs the operations of the present invention. Referring now to FIG. 8, a computer user (not illustrated) typically accesses a computer 300 via a terminal 310 to run programs (not illustrated) stored in memory 320. These programs would include those that perform the operations of the present invention. There are, of course, many different computer system architectures, such as different variations of client/server architectures, or mainframe architectures, or combinations of both, which can be implemented to embody the present invention, and the present invention is not limited to any particular architecture.

As an example, related U.S. application entitled "METHOD AND APPARATUS FOR PROMOTING TAXPAYER COMPLIANCE," having Ser. No. 09/375,214, filed Aug. 16, 1999, and incorporated by reference herein, discloses a computer system for promoting taxpayer compliance and which uses a software embodied audit selection utility. The present invention can be employed as the audit selection utility.

According to the above embodiments of the present invention, an analytical space is created, such as a graph, and taxpayers are positioned in the analytical space. Although it is preferable for the analytical space to be a graph, the analytical space is not limited in this manner. Instead, the analytical space can be any other type of mechanism for analyzing the taxpayers and which provides the appropriate information. Moreover, the creation of an analytical space can be seen as a conceptual organization of information. Thus, according to the present invention, it is not necessary for the analytical space to be "physically" created, but that information is simply arranged in a manner which is conceptualized by the analytical space. Therefore, if the embodiments of the present invention are performed by a computer, it is not necessary for the computer to physically create a graph (or other type of analytical space), but that the computer organize information in a manner conceptualized by a graph.

According to the above embodiments of the present invention, audits are selected in accordance with a specific technique. Of course, once the audits are selected, the tax collecting entity can then, if desired, conduct the audits.

The present invention is applicable to tax collecting entities. Such entities can be federal or state tax collecting entities in the U.S., or in other countries. Moreover, a tax collecting entity can be a government or non-government entity.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An audit selection comprising:
   selecting taxpayers to audit to maximize a total audit assessment amount, said selecting taxpayers comprising
      scoring taxpayers based on historical data to provide respective taxpayers with a score indicating probability of an assessment being made against the taxpayer if an audit of the taxpayer is conducted,
      assigning taxpayers into categories so that taxpayers with the same score can have different probabilities of an assessment based on the category of the taxpayer,
      creating an analytical space for analyzing the taxpayers, the analytical space defined by the taxpayer score and category,
      positioning taxpayers within the analytical space based on their score and category,
      analyzing factors within the analytical space based on historical data,
      using the analyzed factors to predict audit return on auditors' time when auditing taxpayers,
      forecasting assessments against taxpayers based on the predicted audit return on auditors' time, and
      formulating a basis for audit selection from the forecasted assessments, wherein
         the analytical space is a graph having a first axis indicating score and a second axis indicating category, the graph having cells at each intersection of score and category,
         said analyzing factors comprises
            recalculating, from historical data, the probability of making an assessment within each cell, based on the actual taxpayers in that cell,
            performing a regression for each category based on the recalculated probabilities, to determine an equation for each category which forecasts probabilities that an assessment will be made for taxpayers in that category,
            calculating an average assessment amount for cases in each cell, and
            determining the time taken to perform an audit for each cell, and
         said using the analyzed factors uses the equations, calculated average assessment amounts and determined time taken to perform an audit, to predict audit return.

2. An audit selection method as in claim 1, wherein
   said using the analyzed factors uses the analyzed factors to determine a discounted average assessment amount per unit of auditor time, to thereby predict audit return, and
   said forecasting assessments fits polynomial curves to the discounted average assessment amount per unit of auditor time within each of the categories, to forecast assessments.

3. An audit selection method as in claim 2, wherein said formulating formulates a basis for audit selection from the forecasted assessments to maximize total audit assessment amount.

4. An audit selection method comprising:
   creating an underreporting model indicating probability of an assessment being made against respective taxpayers from historical data;
   creating an analytical space for analyzing the taxpayers, the analytical space being based on the underreporting model;
   positioning taxpayers within the analytical space;
   analyzing factors within the analytical space based on historical data;
   using the analyzed factors to predict audit return on auditors' time when auditing taxpayers;
   forecasting assessments against taxpayers based on the predicted audit return; and
   formulating a basis for audit selection from the forecasted assessments, wherein
      the underreporting model scores taxpayers based on historical data to provide respective taxpayers with a score indicating probability of an assessment being made against the taxpayer if an audit of the taxpayer is conducted, and assigns taxpayers into categories so that taxpayers with the same score can have different probabilities of an assessment based on the category of the taxpayer,
      the analytical space is a graph having a first axis indicating score and a second axis indicating category, the graph having cells at each intersection of score and category,
      said analyzing factors comprises
         recalculating the probability of making an assessment within each cell, based on the actual taxpayers in that cell, performing a regression for each category based on the recalculated probabilities, to determine an equation for each category which forecasts probabilities that an assessment will be made for taxpayers in that category, calculating an average assessment amount for cases in each cell, and determining the time taken to perform an audit for each cell, and said using the analyzed factors uses the equations, calculated average assessment amounts and determined time taken to perform an audit, to predict audit return.

5. An audit selection method as in claim 4, wherein said using the analyzed factors uses the analyzed factors to determine a discounted average assessment amount per unit of auditor time, and said forecasting assessments fits polynomial curves to the discounted average assessment amount per unit of auditor time within each of the categories, to forecast assessments.

6. An audit selection method as in claim 5, wherein said formulating formulates a basis for audit selection from the forecasted assessments to maximize total audit assessment amount.

7. An audit selection method comprising:

scoring taxpayers based on historical data to provide respective taxpayers with a score indicating a probability of an assessment being made against the taxpayer if an audit of the taxpayer is conducted;

assigning taxpayers into categories so that taxpayers with the same score can have different probabilities of an assessment based on the category of the taxpayer;

creating an analytical space for analyzing the taxpayers, the analytical space defined by the taxpayer score and category;

positioning taxpayers within the analytical space based on their score and category;

analyzing factors within the analytical space based on historical data;

using the analyzed factors to predict audit return on auditors' time when auditing taxpayers;

forecasting assessments against taxpayers based on the predicted audit return on auditors' time; and formulating a basis for audit selection from the forecasted assessments, wherein the analytical space is a graph having a first axis indicating score and a second axis indicating category, the graph having cells at each intersection of score and category, said analyzing factors comprises recalculating the probability of making an assessment within each cell, based on the actual taxpayers in that cell, performing a regression for each category based on the recalculated probabilities, to determine an equation for each category which forecasts probabilities that an assessment will be made for taxpayers in that category, calculating an average assessment amount for cases in each cell, and determining the time taken to perform an audit for each cell, and said using the analyzed factors uses the equations, calculated average assessment amounts and determined time taken to perform an audit, to predict audit return on auditors' time.

8. An audit selection method as in claim 7, wherein said formulating formulates a basis for audit selection which maximizes total audit assessment amount.

9. An audit selection method comprising:

scoring taxpayers based on historical data to provide respective taxpayers with a score indicating a probability of an assessment being made against the taxpayer if an audit of the taxpayer is conducted;

assigning taxpayers into categories so that taxpayers with the same score can have different probabilities of an assessment based on the category of the taxpayer;

creating an analytical space, the analytical space being a graph having a first axis indicating score and a second axis indicating category, the graph having cells at each intersection of score and category;

positioning taxpayers within the analytical space based on their score and category;

recalculating the probability of making an assessment within each cell of the graph, based on the actual taxpayers in that cell;

performing a regression for each category based on the recalculated probabilities, to determine an equation for each category which forecasts probabilities that an assessment will be made for taxpayers in that category;

calculating an average assessment amount for cases in each cell of the graph;

determining the time taken to perform an audit for each cell of the graph;

using the equations, calculated average assessment amounts and determined time taken to perform an audit, to predict audit return on auditors' time;

forecasting assessments against taxpayers based on the predicted audit return on auditors' time; and formulating a basis for audit selection from the forecasted assessments.

10. An audit selection method as in claim 9, wherein said formulating formulates a basis for audit selection which maximizes total audit assessment amount.

11. An audit selection method comprising:

selecting taxpayers to audit to maximize a total audit assessment amount, said selecting taxpayers comprising scoring taxpayers based on historical data to provide respective taxpayers with a score indicating probability of an assessment being made against the taxpayer if an audit of the taxpayer is conducted;

assigning taxpayers into categories so that taxpayers with the same score can have different probabilities of an assessment based on the category of the taxpayer;

creating an analytical space for analyzing the taxpayers, the analytical space being a graph having a first axis indicating score and a second axis indicating category, the graph having cells at each intersection of score and category;

positioning taxpayers within the analytical space based on their score and category;

analyzing factors within each cell of the analytical space based on actual taxpayers within that cell and historical data via the use of regression;

using the analyzed factors to predict audit return on auditors' time when auditing taxpayers;

forecasting assessments against taxpayers based on the predicted audit return on auditors' time; and formulating a basis for audit selection from the forecasted assessments, wherein said analyzing factors produces an average assessment amount for taxpayers in each cell and time taken to perform an audit for taxpayers in each cell.

12. An audit selection method as in claim 11, wherein said using the analyzed factors uses the average assessment amounts and the times taken to perform an audit, to predict audit return.

13. An audit selection method comprising:
   selecting taxpayers to audit to maximize a total audit assessment amount, said selecting taxpayers comprising
      scoring taxpayers based on historical data to provide respective taxpayers with a score indicating probability of an assessment being made against the taxpayer if an audit of the taxpayer is conducted;
      assigning taxpayers into categories so that taxpayers with the same score can have different probabilities of an assessment based on the category of the taxpayer;
      creating an analytical space for analyzing the taxpayers, the analytical space being a graph having a first axis indicating score and a second axis indicating category, the graph having cells at each intersection of score and category;
      positioning taxpayers within the analytical space based on their score and category;
      analyzing factors within each cell of the analytical space based on actual taxpayers within that cell and historical data via the use of regression;
      using the analyzed factors to predict audit return on auditors' time when auditing taxpayers;
      forecasting assessments against taxpayers based on the predicted audit return on auditors' time; and
      formulating a basis for audit selection from the forecasted assessments, wherein said analyzing factors comprises:
         recalculating the probability of making an assessment within each cell, based on the actual taxpayers in that cell, and
         performing an analysis for each category based on the recalculated probabilities, to determine an equation for each category which forecasts probabilities that an assessment will be made for taxpayers in that category.

14. An audit selection method comprising:
   selecting taxpayers to audit to maximize a total audit assessment amount, said selecting taxpayers comprising
      scoring taxpayers based on historical data to provide respective taxpayers with a score indicating probability of an assessment being made against the taxpayer if an audit of the taxpayer is conducted;
      assigning taxpayers into categories so that taxpayers with the same score can have different probabilities of an assessment based on the category of the taxpayer;
      creating an analytical space for analyzing the taxpayers, the analytical space being a graph having a first axis indicating score and a second axis indicating category, the graph having cells at each intersection of score and category;
      positioning taxpayers within the analytical space based on their score and category;
      analyzing factors within each cell of the analytical space based on actual taxpayers within that cell and historical data via the use of regression;
      using the analyzed factors to predict audit return on auditors' time when auditing taxpayers;
      forecasting assessments against taxpayers based on the predicted audit return on auditors' time; and
      formulating a basis for audit selection from the forecasted assessments, wherein said analyzing factors comprises recalculating probability of making an assessment within each cell, based on actual taxpayers in that cell, and said using the analyzed factors predicts audit return in accordance with the recalculated probabilities.

15. An audit selection method comprising:
   selecting taxpayers to audit to maximize a total audit assessment amount, said selecting taxpayers comprising
      scoring taxpayers based on historical data to provide respective taxpayers with a score indicating probability of an assessment being made against the taxpayer if an audit of the taxpayer is conducted;
      assigning taxpayers into categories so that taxpayers with the same score can have different probabilities of an assessment based on the category of the taxpayer;
      creating an analytical space for analyzing the taxpayers, the analytical space being a graph having a first axis indicating score and a second axis indicating category, the graph having cells at each intersection of score and category;
      positioning taxpayers within the analytical space based on their score and category;
      analyzing factors within each cell of the analytical space based on actual taxpayers within that cell and historical data via the use of regression;
      using the analyzed factors to predict audit return on auditors' time when auditing taxpayers;
      forecasting assessments against taxpayers based on the predicted audit return on auditors' time; and
      formulating a basis for audit selection from the forecasted assessments, wherein said analyzing factors comprises performing an analysis to determine an equation for each category which forecasts that an assessment will be made for taxpayers in that category, and said using the analyzed factors predicts audit return in accordance with the equations.

16. An audit selection comprising:
   selecting taxpayers to audit to maximize a total audit assessment amount, said selecting, taxpayers comprising
      scoring taxpayers based on historical data to provide respective taxpayers with a score indicating probability of an assessment being made against the taxpayer if an audit of the taxpayer is conducted,
      assigning taxpayers into categories so that taxpayers with the same score can have different probabilities of an assessment based on the category of the taxpayer,
      creating an analytical space for analyzing the taxpayers, the analytical space defined by the taxpayer score and category,
      positioning taxpayers within the analytical space based on their score and category,
      analyzing factors within the analytical space based on historical data,
      using the analyzed factors to predict audit return on auditors' time when auditing taxpayers,
      forecasting assessments against taxpayers based on the predicted audit return on auditors' time, and formulating a basis for audit selection from the forecasted assessments, wherein
the analytical space is a graph having a first axis indicating score and a second axis indicating category, the graph having cells at each intersection of score and category,
said analyzing factors comprises
recalculating, from historical data, the probability of making an assessment within each cell, based on the actual taxpayers in that cell,
performing a regression analysis for each category based on the recalculated probabilities, to determine an equation for each category which forecasts probabilities that an assessment will be made for taxpayers in that category,
calculating an average assessment amount for cases in each cell, and
determining the time taken to perform an audit for each cell, and
said using the analyzed factors uses the equations, calculated average assessment amounts and determined time taken to perform an audit, to predict audit return.

17. An audit selection method comprising:
creating an underreporting model indicating probability of an assessment being made against respective taxpayers from historical data;
creating an analytical space for analyzing the taxpayers, the analytical space being based on the underreporting model;
positioning taxpayers within the analytical space;
analyzing factors within the analytical space based on historical data;
using the analyzed factors to predict audit return on auditors' time when auditing taxpayers;
forecasting assessments against taxpayers based on the predicted audit return; and
formulating a basis for audit selection from the forecasted assessments, wherein
the underreporting model scores taxpayers based on historical data to provide respective taxpayers with a score indicating probability of an assessment being made against the taxpayer if an audit of the taxpayer is conducted, and assigns taxpayers into categories so that taxpayers with the same score can have different probabilities of an assessment based on the category of the taxpayer,
the analytical space is a graph having a first axis indicating score and a second axis indicating category, the graph having cells at each intersection of score and category,
said analyzing factors comprises
recalculating the probability of making an assessment within each cell, based on the actual taxpayers in that cell,
performing a regression analysis for each category based on the recalculated probabilities, to determine an equation for each category which forecasts probabilities that an assessment will be made for taxpayers in that category,
calculating an average assessment amount for cases in each cell, and
determining the time taken to perform an audit for each cell, and
said using the analyzed factors uses the equations, calculated average assessment amounts and determined time taken to perform an audit, to predict audit return.

18. An audit selection method comprising:
scoring taxpayers based on historical data to provide respective taxpayers with a score indicating a probability of an assessment being made against the taxpayer if an audit of the taxpayer is conducted;
assigning taxpayers into categories so that taxpayers with the same score can have different probabilities of an assessment based on the category of the taxpayer;
creating an analytical space for analyzing the taxpayers, the analytical space defined by the taxpayer score and category;
positioning taxpayers within the analytical space based on their score and category;
analyzing factors within the analytical space based on historical data;
using the analyzed factors to predict audit return on auditors' time when auditing taxpayers;
forecasting assessments against taxpayers based on the predicted audit return on auditors' time; and
formulating a basis for audit selection from the forecasted assessments, wherein
the analytical space is a graph having a first axis indicating score and a second axis indicating category, the graph having cells at each intersection of score and category,
said analyzing factors comprises
recalculating the probability of making an assessment within each cell, based on the actual taxpayers in that cell,
performing a regression analysis for each category based on the recalculated probabilities, to determine an equation for each category which forecasts probabilities that an assessment will be made for taxpayers in that category,
calculating an average assessment amount for cases in each cell, and
determining the time taken to perform an audit for each cell, and
said using the analyzed factors uses the equations, calculated average assessment amounts and determined time taken to perform an audit, to predict audit return on auditors' time.

* * * * *